United States Patent

Awata et al.

[11] 3,980,925
[45] Sept. 14, 1976

[54] BEAM MISLANDING CORRECTING SYSTEM

[75] Inventors: Yoriyoshi Awata; Kiyoyuki Takagawa, both of Tokyo, Japan

[73] Assignee: Sony Corporation, Tokyo, Japan

[22] Filed: June 9, 1975

[21] Appl. No.: 584,813

[30] Foreign Application Priority Data
June 20, 1974  Japan.............................. 49-72186

[52] U.S. Cl............................. 315/370; 315/380; 315/401
[51] Int. Cl.² ......................................... H01J 29/76
[58] Field of Search ............ 315/401, 370, 409, 380

[56] References Cited
UNITED STATES PATENTS

| | | | |
|---|---|---|---|
| 2,900,564 | 8/1959 | Barkow................................ | 315/401 |
| 3,562,578 | 2/1971 | Takahashi............................ | 315/401 |
| 3,668,464 | 6/1972 | Tokita et al. ....................... | 315/401 |

*Primary Examiner*—Maynard R. Wilbur
*Assistant Examiner*—David Leland
*Attorney, Agent, or Firm*—Lewis H. Eslinger; Alvin Sinderbrand

[57] ABSTRACT

A system for compensating for mislanding of electron beams on the screen of a color cathode ray tube resulting from thermal expansion of a beam selecting structure in the tube which comprises electromagnetic devices provided on the tube for producing respective magnetic fields by means of a current supplied thereto so as to change the paths of the electron beams passing through the beam selecting structure, and a circuit for supplying to the electro-magnetic devices a first correcting current varying substantially in response to changes in the temperature of the beam selecting structure and a second correcting current varying in accordance with a predetermined change in value during the initial period of the operating condition of the tube.

7 Claims, 6 Drawing Figures

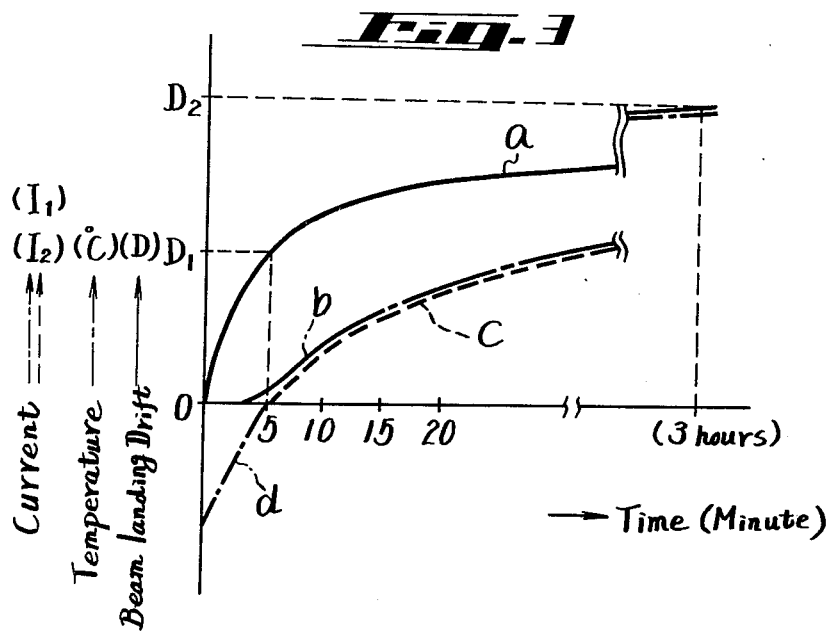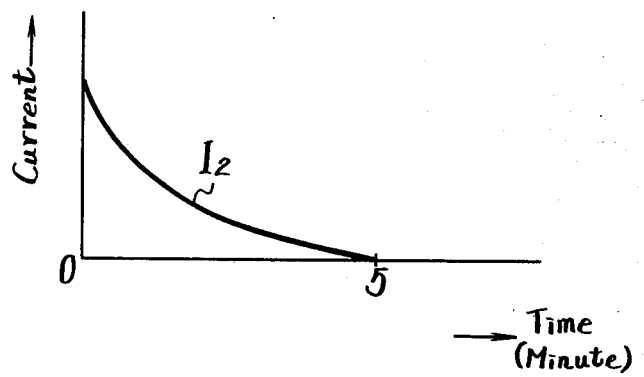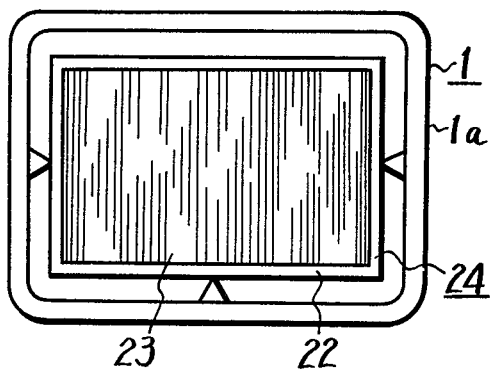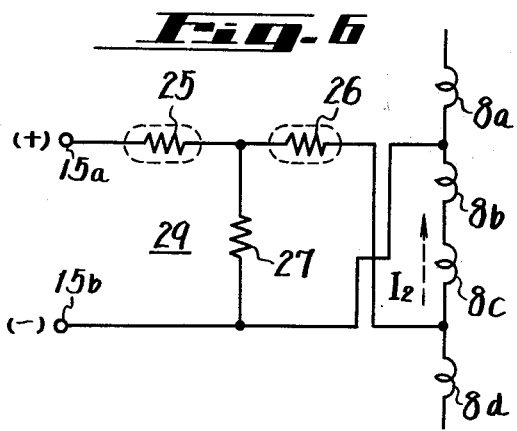

BEAM MISLANDING CORRECTING SYSTEM

BACKGROUND OF THE INVENTION

1. Field of the Invention

This invention generally relates to a beam mislanding correcting system for a color cathode ray tube, and more particularly is directed to an improvement in a system for compensating for the mislanding of electron beams in a cathode ray tube caused by thermal expansion of a beam selecting structure provided in the tube.

2. Description of the Prior Art

In a color cathode ray tube having a color phosphor screen, there is provided a beam selecting structure, in the form of a mask or grille electrode which has a plurality of apertures or slits, to have the electron beams land only on the selected phosphors of the screen that emit light of predetermined colors. During operation of such tubes, the impingement of the electron beams on the beam selecting structure generates heat and thereby increases the temperature of the beam selecting structure. The increased temperature of the beam selecting structure causes thermal expansion or distortion thereof, and such as thermal expansion or distortion changes the positions of the apertures or slits of the beam selecting structure in relation to the respective groups of color phosphors of the screen. The change in positions of the apertures or slits relative to the respective groups of color phosphors results in mislanding of the electron beams and this causes deterioration in color purity. The mislanding of the electron beams is more striking at the peripheral portions of the screen than at the center thereof.

Various systems have been proposed to compensate for the described mislanding of the electron beams resulting from thermal expansion of the beam selecting structure. A co-pending application, Ser. No. 451,306, filed Mar. 14, 1974 now U.S. Pat. No. 3,950,671, and assigned to the assignee of the present application, discloses a novel system for compensating for the mislanding of the electron beams in such a way as to avoid some of the drawbacks inherent in existing systems.

In the system of the above mentioned co-pending application, compensation for thermally induced mislanding of the electron beams is provided by electromagnetic means, for example, a coil wound on a magnetic core, disposed adjacent the color cathode ray tube and being operative, when supplied with current, to produce magnetic fields which change the paths of the electron beams passing through the beam selecting structure, and the current for such a coil is controlled in accordance with the temperature of the beam selecting means. In practice, since it is quite difficult to directly measure the temperature of the beam selecting structure, the temperature of something which undergoes temperature changes similar to those of the beam selecting structure is detected by a temperature responsive element connected to the circuit for supplying the current to the coil and thereby the current varying in accordance with changes in the temperature of the beam selecting structure is supplied to the coil. In such a case, generally, a horizontal and vertical deflection yoke is taken as the thing undergoing temperature changes similar to those of the beam selecting structure. However, although the temperature of the beam selecting structure increases with the result that thermal expansion or distortion thereof is caused immediately after the start of operation of the television receiver, the temperature of the deflection yoke is delayed to start changing similarly to those of the beam selecting structure. Consequently, during this delay in the start of temperature change, the current supplied to the coil is not controlled properly and the mislanding of the electron beam can not be compensated for. The length of duration of such a delay depends on the respective television receivers and may be one to ten minutes in general.

SUMMARY OF THE INVENTION

Accordingly, it is an object of the present invention to provide an improvement in the beam mislanding correcting system of the type disclosed in the aforementioned application Ser. No. 451,306.

Another object of the present invention is to provide a beam mislanding correcting system for a color cathode ray tube which correctly compensates for mislanding of the electron beams for the whole duration of the operation of the color cathode ray tube.

In accordance with the present invention, compensation for mislanding of the electron beams caused by thermal expansion or distortion of the beam selecting structure is provided by electromagnetic means disposed adjacent the color cathode ray tube and producing magnetic fields by which the paths of the electron beams passing through the beam selecting structure are changed, when a current is supplied thereto. Such electromagnetic means is supplied with a main correcting current controlled in accordance with changes in the temperature of the beam selecting structure detected indirectly and also with an auxiliary correcting current, the value of which is varied in accordance with a predetermined change during a predetermined period immediately after the start of operation of the color cathode ray tube, and thereby the mislanding of the electron beams caused in the initial period of the operation of the color cathode ray tube, which cannot be compensated for by the main correcting current for electromagnetic means, is also properly corrected.

Other objects, features and advantages of the present invention will be apparent in the following description of an embodiment taken in conjunction with the accompanying drawings.

BRIEF DESCRIPTION OF THE DRAWINGS

FIGS. 3 and 4 are schematic graphs used for explanation of the beam mislanding correction system shown in FIGS. 1 and 3.

FIG. 5 shows one embodiment of a beam selecting structure having a plurality of slits provided in a color cathode ray tube to which the present invention is applicable.

FIG. 6 is a schematic circuit diagram showing a part of another embodiment of the beam mislanding system according to the present invention.

DESCRIPTION OF THE PREFERRED EMBODIMENTS

Figure 1:
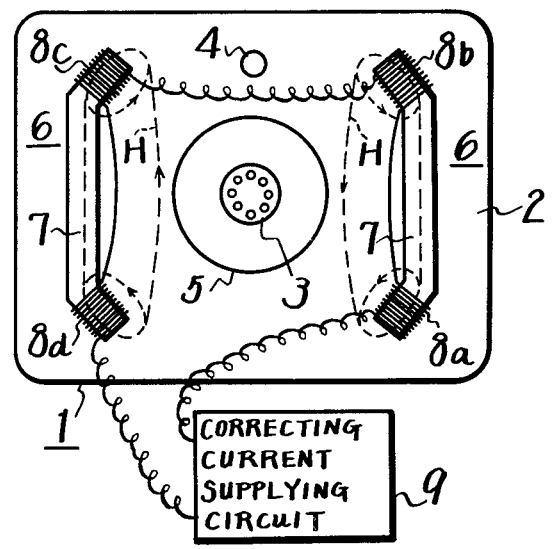
FIG. 1 is a rear view of a cathode ray tube accompanying one embodiment of a beam mislanding correcting system according to the present invention.

FIG. 1 shows the rear view of a cathode ray tube in which an embodiment of the beam mislanding correcting system according to the present invention is employed. In the figure, reference numeral 1 designates generally a color cathode ray tube which is viewed from its rear side, 2 its funnel portion, 3 its neck portion, 4 its anode button, and 5 its deflection yoke, respectively. In FIG. 1, reference numeral 6 denotes an electromagnetic device consists of a magnetic body 7 (which is, for example, a silicon steel plate containing about 3 weight % of silicon) and coils wound on both end portions thereof. A pair of the electromagnetic devices 6 are disposed at the left and right sides of the funnel portion 2 as shown in FIG. 1, so that the coils wound on the magnetic body 7 of each electromagnetic device 6 are located near the corners of the funnel portion 2. For convenience's sake of the description, the four coils are designated by reference numerals 8a, 8b, 8c and 8d, respectively. Though not shown, separate coils could be wound on the respective magnetic bodies 7 at their mid portions between the coils 8a, 8b and 8c, 8d.

The four coils 8a, 8b, 8c and 8d are connected with one another in series and then to a correcting current supplying circuit 9. From the coils 8a to 8d, there are originated magnetic fluxes H as shown in FIG. 1 by dotted lines in the directions indicated by arrows. The locating directions of the respective coils 8a to d are so selected that the magnetic fluxes H give electron beams partial deflections.

An example of the correcting current supplying circuit 9 according to the present invention will be now described with reference to FIG. 2. In the figure, reference numeral 10 designates a DC voltage source terminal of + B; 11 a transistor; and 12 and 13 are temperature-sensitive elements (for example, thermistors) which are connected together in series between the voltage source terminal 10 and the ground. The base electrode of the transistor 11 is connected to the connection point between the elements 12 and 13 to be supplied with a bias voltage, its emitter electrode is connected through a resistor 14 to the voltage source terminal 10, and its collector electrode is connected to one end of the series connection of coils 8a to 8d whose other end is grounded. One of the temperature-sensitive elements, for example, element 13 is mounted on the deflection yoke 5 as described previously to detect the temperature of the same, while the other element 12 is mounted on, for example, a printed circuit board (not shown) so as to detect the ambient temperature of the color cathode ray tube 1.

Accordingly, when the temperature of the beam selecting structure in the color cathode ray tube 1 becomes high, it is subjected to thermal expansion and hence mislanding of the electron beam is caused, the temperature of the deflection yoke 5 becomes high. At this time or as the temperature of the deflection yoke 5 becomes high, the resistance value of the element 13 is decreased and accordingly the base potential of the transistor 11 becomes low. Thus, the internal resistance of the transistor 11 decreases, and accordingly a main correcting current $I_1$ supplied to the coils 8a to 8d increases, so that the path of the electron beam is varied with the magnetic field produced in the coils 8a to 8d to correct the mislanding of the electron beam.

In the system according to the present invention, a gradually reducing current producing circuit 29 is provided in the above apparatus, and immediately after the main switch (not shown) of a color television receiver in which the above color cathode ray tube 1 is employed is made ON, a gradually reducing current $I_2$, by way of example, from the circuit 29 is supplied to one, two, three or all of the coils 8a to 8d of the electromagnetic devices 6 as an auxiliary correcting current during a predetermined period of time.

Figure 2:
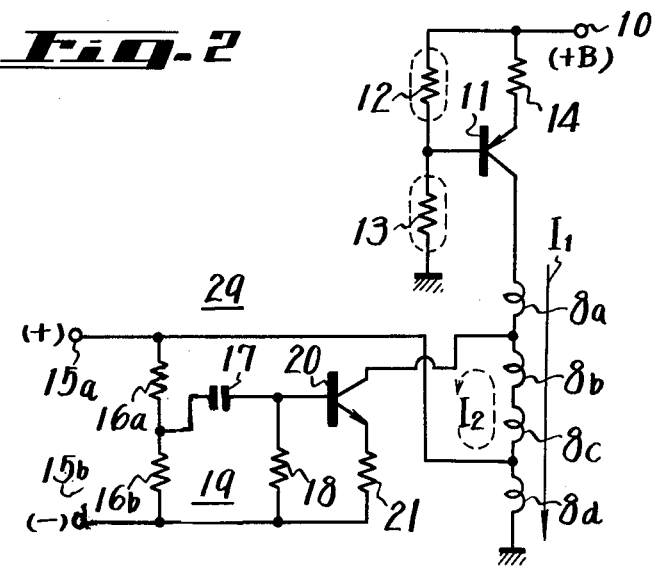
FIG. 2 is a schematic circuit diagram showing one embodiment of a beam mislanding correcting system according to the present invention.

As shown in FIG. 2, the circuit 29 is constructed as follows. Between voltage source terminals 15a and 15b, which are supplied with a voltage when the main switch of the television receiver is made ON (and any one of which terminals is not grounded), a series connection of resistors 16a and 16b is connected. A charging and discharging circuit 19 which consists of a capacitor 17 and a resistor 18 is provided. The connection point between the resistors 16a and 16b is connected through the capacitor 17 of the circuit 19 to the base electrode of a transistor 20. Thus, the gradually reducing current producing circuit 29 is formed. In this case, the voltage source terminal 15a is connected to the other voltage source terminal 15b through any of the coils 8a to 8d of the electromagnetic devices 6, the collector-emitter path of the transistor 11 and through a resistor 21. In the example of FIG. 2, the auxiliary correcting current $I_2$ which pass through the transistor 20 is supplied to the series connection of the coils 8b and 8c. In this case, the voltage source terminals 10, 15a and 15b are separately provided.

A curve $a$ in the graph of FIG. 3 shows the relationship between the time from the start of operation after the main switch of the color television receiver is put ON and an electron beam landing drift D (which is in proportion to the temperature of the beam selecting structure). According to the experiment using a certain color television receiver, the drift D reaches a constant value $D_2$ after about 3 hours when the main switch is put ON. In this case, it is noted that a drift $D_1$ becomes one half of the constant drift $D_2$ after about 5 minutes when the main switch is put ON. In the graph of FIG. 3, an one-dot chain line curve $b$ shows the relationship between the above time and the temperature variation of the deflection yoke 5, and a dotted line curve $c$ shows the variation of the main correcting current $I_1$ based upon the curve $b$. As may be apparent from the graph of FIG. 3, after 5 minutes from the time when the switch is made ON, the electron beam landing drift is corrected by the main correcting current $I_1$, or during the first time period of about 5 minutes from the switch being made ON there is no temperature variation in the deflection yoke 5, and hence the electron beam landing drift caused during this period of 5 minutes can not be corrected with the main correcting current $I_1$.

That is, as may be apparent from the above description, the main correcting current $I_1$ substantially starts its flowing after about 5 minutes from the switch being made ON. At this time, however, the beam selecting structure is already distorted to cause mislanding of the electron beam.

Accordingly, it may be understood that if the positional relation between, for example, the beam selecting structure and the phosphor screen (not shown) of the color cathode ray tube 1 is so selected that no mislanding of the electron beam occurs even through the main correcting current $I_1$ is substantially zero during the above period of time, the mislanding of the electron beam which may be caused after that period of time can be suitably corrected by the main correcting current $I_1$. For this reason, in the present invention, it is so selected that when the beam landing drift is $D_1$, the main correcting current $I_1$ is zero and the mislanding of the electron beam is correctly compensated for. Further, during the period of about 5 minutes from the switch being made ON within which (the main correcting current $I_1$ is zero) the beam landing drift is lower than $D_1$, the substantial beam landing drift is made as $D_1$.

The circuit 29 shown in FIG. 2 is provided so as to supply a correcting current for this purpose to the coils. Thus, when the main switch of the color television receiver is put ON to make the transistor 20 ON, the auxiliary correcting current $I_2$ is supplied to the coils 8b and 8c which current $I_2$ is shown in FIG. 2 by a dotted line arrow whose direction is opposite to that of the main correcting current $I_1$. In this case, the time constant of the charging and discharging circuit 19 is so selected that the auxiliary correcting current $I_2$ decreases gradually with the lapse of time as shown in FIG. 4 and becomes substantially zero after about 5 minutes from the main switch being made ON. The variation of the auxiliary correcting current $I_2$ is shown in FIG. 3 by an one-dot line curve $d$. Thus, the auxiliary correcting current $I_2$ having the variation characteristics shown in FIG. 4 is supplied to the coils 8b and 8c during the period of about 5 minutes from making the main switch ON with the result that the electron beam is subject to correction to have the landing drift of $D_1$ immediately. As a result, even if the main correcting current $I_1$ is zero, the mislanding of the electron beam is correctly compensated for.

In the illustrated embodiment of the invention, the auxiliary correcting current $I_2$ is supplied to the coils 8b and 8c which are located at the upper corners of the color cathode ray tube 1 as shown in FIG. 1. This reason is that the color cathode ray tube 1 of this example employs a so-called aperture grille having a number of parallel slits as its beam selecting structure.

As shown in FIG. 5, a beam selecting structure 24, which is so-called as an aperture grille, is formed of a rectangular frame 22 and a grille 23 stretched over the frame 22 in the vertical direction. Such a beam selecting structure 24 is supported within a panel 1a of the color cathode ray tube 1 at three positions on the left, right and lower sides of the frame 22. Accordingly, the thermal distortion of the aperture grille or beam selecting structure 24 is caused remarkably at the left and side ends of the upper portion thereof immediately after the main switch of the color television receiver is made ON, and hence mislanding of the electron beam is caused appreciably at the positions. However, the positions of the thermal distortion of the beam selecting structure 24 differ depending upon the construction thereof or method for supporting the same in the panel 1a, so that it is sufficient to select the coil to which the auxiliary correcting current $I_2$ is applied depending thereupon.

As described above, it is impossible by the prior art to correct mislanding of the electron beam during the initial time period of the operation of the color television receiver, but such the mislanding of the electron beam can be corrected easily by the present invention.

FIG. 6 shows another embodiment of the circuit 29 in which two thermistors 25 and 26 having positive-resistive characteristics are used. With this circuit 29, when the main switch of the color television receiver is made ON, a current flows through the thermistor 25 and a resistor 27, so that the thermistor 25 generates heat in itself with the result that the thermistor 26 is heated. With such a circuit construction, since the thermistors 25 and 26 are low in resistance when the main switch of the receiver is made ON, but thereafter their resistances become high gradually, the above auxiliary correcting current $I_2$ can be flowed through the coils 8b and 8c, respectively.

It may be apparent that many modifications and variations could be effected by one skilled in the art without departing from the spirits or scope of the novel concepts of the present invention.

We claim as our invention:

1. A system for correcting mislanding of electron beams on the color phosphor screen of a color cathode ray tube which contains a beam selecting structure through which the electron beams pass for landing on the screen, said system comprising:
   a. electromagnetic means including coil means for producing magnetic field in response to a current flowing in said coil means, said electromagnetic means being located adjacent said tube so as to change the paths of said beams through said beam selecting structure and thereby correct mislanding of the electric beams on said screen;
   b. first circuit means for supplying a first correcting current to said coil means, said first circuit means including first control means for varying said first correcting current in accordance with changes in the temperature of said beam selecting structure during the operation of said tube; and
   c. second circuit means for supplying a second correcting current to said coil means, said second circuit means including second control means for varying said second correcting current so as to provide a predetermined change in value thereof during the initial warm-up period of said tube upon said operation thereof.

2. A system according to claim 1, wherein said first control means includes a temperature-responsive element responding to variations in the temperature of a device undergoing temperature changes substantially similar to those of the beam selecting structure.

3. A system according to claim 2, wherein said device comprises a deflection yoke.

4. A system according to claim 2, wherein said second control means is constructed so as to gradually decrease the value of said second correcting current during said initial warm-up period.

5. A system according to claim 4, wherein said second circuit means comprises a voltage source being operable to supply with a voltage only during the operating condition of said tube and said second control means connected between said voltage source and said coil means.

6. A system according to claim 5, wherein said second control means comprises a transistor having a collector-emitter path through which said coil means is connected with said voltage source and a base-bias circuit for said transistor forming a charging and discharging circuit with a predetermined time constant.

7. A system according to claim 5, wherein said second control means comprises a pair of temperature-responsive elements connected in series and each increasing its resistance value in accordance with temperature increase, through which said coil means is connected with said voltage source, and a resistor connected in parallel to a series connection of one of said temperature responsive elements and said coil means.

* * * * *